United States Patent Office 3,143,469
Patented Aug. 4, 1964

3,143,469
ANTI-CHOLESTEROL NICOTINIC ACID N-OXIDE
André Georges Debay, 5 Rue Georges Citerne, Paris, Seine, France, and Jacques Louis Marie Joseph Théry, 53 Rte. de Croissy, Le Vesinet, Seine-et-Oise, France
No Drawing. Filed June 15, 1962, Ser. No. 202,701
Claims priority, application France June 26, 1961
8 Claims. (Cl. 167—65)

The object of the present invention is to provide a therapeutic composition having a cholesterol lowering action and characterized in that it contains as active principle nicotinic acid N-oxide having the formula:

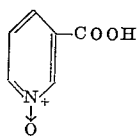

As the active principle is an acid it can be used in the form of a free acid or in the form of a therapeutically administrable salt. Among these salts there can be mentioned the sodium salt and the magnesium salt.

The physico-chemical characteristics of these compounds and their process of preparation will be described hereinafter.

Nicotinic acid N-oxide or N-oxinicotinic acid is a known compound no therapeutic application of which has been proposed up to the present time.

It is a compound having a molecular weight of 139 and an M.P. of 250° C. Its UV spectrum is characterized by two maxima at 2220 A. and 2700 A., the respective optical densities being 0.810–0.820 and 0.430–0.440 in hydro-alcoholic solution at the concentration of 5 µg./ml. It is soluble to the extent of 0.6% in water at 20° C., more soluble in hot water and hot methanol, soluble in an acid medium, insoluble in ether, benzene and chloroform.

Nicotinic acid N-oxide can be prepared in accordance with the method of G. R. Clemo and H. Koenig (J. Chem. Soc., 1949, Supplement p. 231). An example of such a preparation in which all the parts are expressed in weights will be given hereinafter.

EXAMPLE

Heat in a water bath while stirring from time to time: nicotinic acid (one part) in acetic acid (2 parts) and perhydrol (3 parts). After three hours, the gaseous emanation ceases and the solution is evaporated to dryness. The yellow residue recrystallized twice in methanol gives the nicotinic acid N-oxide in the form of slightly yellow needles. M.P.=249° C.; yield 70–80%.

The salts of the nicotinic acid N-oxide can thereafter be prepared by salification of the acid by means of the corresponding base. In this way the sodium and magnesium salts are obtained. The magnesium salt or magnesium N-oxinicotinate is a new compound not yet described in the literature.

It satisfies the following formula:

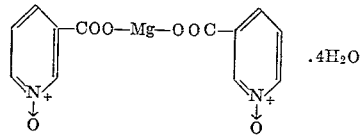

Its molecular weight is 372.3 and its M.P. is 320–330° C. with decomposition.

Its solubility characteristics are as follows:

| | Percent |
|---|---|
| In water at 20° C. | 2.72 |
| In methanol | 2.81 |
| In absolute ethanol | 0.18 |
| Insoluble in 95% ethanol. | |

The identification of the magnesium N-oxinicotinate can be obtained by the absorption spectrum in ultra-violet in hydro-alcoholic solution at the concentration of 5 µg./ml. (same operational conditions as for the nicotinic acid N-oxide).

Two maxima:
2200 A.→O.D. (optical density)=640
2650 A.→O.D. (optical density)=345
Ratio of the optical densities at maxima:

$$\text{Rm.} \frac{0.640}{0.345} = 1.85$$

This specific ratio is that of the N-oxinicotinic ring.

Moreover, the quantity determination of nicotinic acid N-oxide contained in the magnesium salt can be carried out by spectrophotometry in ultra-violet.

For this purpose after adjusting the pH to 1.8 by addition of N/10 hydrochloric acid (pH of nicotinic acid N-oxide) there is compared at 2700 A. a hydro-alcoholic solution of the salt at the concentration of 5 µg./ml. with a reference solution of the acid at the same concentration.

The following optical density values are found:

| | |
|---|---|
| O.D. of nicotinic acid N-oxide | 0.435 |
| O.D. of magnesium nicotinate N-oxide | 0.325 |

This denotes a 74.7% content of nicotinic acid N-oxide in its magnesium salt.

Further, the quantity determination of the magnesium is effected by complexometry and the König reaction with cyanogen bromide permits ascertaining the possible traces of nicotinic acid.

The toxicological and pharmacological studies carried out with nicotinic acid-oxide or its salts gave the following results:

(a) Acute Toxicity

By the intravenous route in the mouse.

The nicotinic acid N-oxide is injected in the form of its sodium salt soluble in water or the physiological saline solution. The $LD_{50}$ was determined by the Karber and Behrens method.

The value of 1.50 g./kg. was obtained.

(b) Chronic Toxicity

Three groups of 10 male mice of the same stock and age subjected to a balanced diet received the nicotinic acid N-oxide in the form of its sodium salt in their drinking water during 60 days. The concentration of the solution was 10% and the mean daily consumption was therefore 1.70 g./kg. for the duration of the study.

The weight curve was observed. It showed no drop and the mean weight of the mice was 31 g. at the beginning of the study and 37 g. at the end thereof.

After 60 days the mice were sacrificed. The livers and kidneys were removed for histologic examination. No significant lesion was observed.

Further, the quantity determination of the total hepatic lipids was carried out. 6.2 g. per 100 g. of fresh liver was found, which represents a normal content. The following were also normal: the phospho-lipids and the total hepatic cholesterol: 2.69 g. and 0.37 g. respectively for 100 g. of fresh liver.

(c) Action on the Metabolism of the Cholesterol

If homogeneous groups of mice are subjected to an unbalanced diet rich in lipids and glucides to which is added 3% of cholesterol and which contains only 3% of protides, a considerable lipidic accumulation in the region of the liver is rapidly created. This fatty excess is verified after 10 days of diet by the histologic examination which reveals the presence of very numerous lipidic vesicles invading the whole of the hepatic parenchyma. Different types of other cellular lesions can also accompany this steatosis (necrosis, inflammatory infiltrates etc.).

The analytic study of the livers permits confirming the high fatty content of this organ (32.5 g. of total lipids for 100 g. of fresh liver). It also reveals a marked drop in the phospholipidic fraction and a rise in the hepatic cholesterol (1.30 g. and 1.40 g. respectively for 100 g. of fresh liver).

Comparative tests were carried out under the same conditions by using the same diet to which was added 2% of nicotinic acid N-oxide.

The following was observed:

(1) This product does not have a lipotropic effect in that, as opposed to agents termed "lipotropic," it does not permit a sufficiently significant drop in the content of the total hepatic lipids (found: 27.3 g. per 100 g. of fresh liver).

(2) This product has, however, an effect on the hepatic cholesterol; the contents found for this element in the livers remain lower than those of the reference mice (found: 0.70 to 0.90 for 100 g. of fresh liver).

Moreover, in the animals receiving nicotinic acid N-oxide contents of hepatic phospholipids were observed which were higher than those of the reference animals (1.6 to 1.8 g. for 100 g. of fresh liver), and this leads to the conclusion that there is an improvement in the cholesterol-phospholipids ratio in the region of the livers of the treated animals.

These pharmacological studies reveal that the nicotinic acid N-oxide has the cholesterol lowering property already described in respect of nicotinic acid when it is administered at high doses in prolonged treatments.

A clinical study of the tolerance revealed however that nicotinic acid N-oxide differs from nicotinic acid in that it does not have an immediate vaso-dilatation effect, which is a characteristic of nicotinic acid and generally occurs after absorption of a dose exceeding 100 mg. of the latter compound.

The nicotinic acid N-oxide is therefore of advantageous utility in cholesterol lowering treatments in view of the fact that the vaso-dilatation property is not particularly required in this particular indication and is even often considered undesirable.

In this indication the active principle is advantageously administered by the mouth route at the daily dose of 0.40 to 6 g. although the other parenteral and rectal administration routes can also be employed.

The active principle can for example be put in the following pharmaceutical forms.

A. Compound powder:

|   | G. |
|---|---|
| Magnesium salt of nicotinic acid N-oxide | 2.67 |
| Citric acid | 0.15 |
| Alginic acid | 0.35 |
| Semolina sugar to make up 10 g. | |

This powder can be put into damp-proof aluminum packets, each packet containing 10 g. of this powder.

B. Pills: Nicotinic acid N-oxide ---- 1 g. for one pill.

C. Tablets:
Nicotinic acid N-oxide ---- g-- 0.20
Kaolin, wheat starch, rice starch, lactose, magnesium stearate, talc, to make up one 0.357 g. tablet.

D. Tablets:
Magnesium salt of nicotinic acid N-oxide --g-- 0.267
Kaolin, wheat starch, rice starch, lactose, carbowax 6000, talc, to make up one 0.438 g. tablet.

E. Gelules:
Nicotinic acid N-oxide ---- g-- 0.20
Or magnesium salt of nicotinic acid N-oxide for a gelule prefabricated in hardened gelatin ---- g-- 0.30

F. Suppositories:
Nicotinic acid N-oxide ---- g-- 0.50
Cocoa-butter ---- g-- 2.50

G. Suppositories:
Magnesium salt of nicotinic acid N-oxide --g-- 0.50
Cocoa-butter ---- g-- 2.50

H. Injectable solute:
Sodium salt of nicotinic acid N-oxide ---- g-- 0.50
Pyrogene-free sterile water to make up 5 ml.

Having now described our invention what we claim as new and desire to secure by Letters Patent is:

1. Therapeutic composition having a cholesterol lowering action comprising an active compound selected from the group consisting of nicotinic acid N-oxide having the formula:

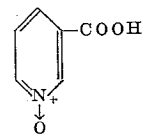

and the therapeutically administrable salts thereof, and a pharmaceutic vehicle, said composition being in the form of a unit dose containing an amount of active compound suitable for the daily administration of 0.40 to 6 g. of said compound.

2. Composition as claimed in claim 1, wherein said salt is a sodium salt.

3. Composition as claimed in claim 1, wherein said salt is a magnesium salt.

4. Composition as claimed in claim 1, wherein the vehicle is solid, the composition being adapted for administration by the mouth route.

5. Composition as claimed in claim 1, wherein the vehicle is pasty, the composition being adapted for administration by the rectal route in the form of suppositories.

6. Composition as claimed in claim 1, wherein the vehicle is an injectable sterile liquid, the composition being adapted for administration by the parenteral route.

7. Process for lowering the cholesterol level in patients, comprising administering to said patients an active compound selected from the group consisting of nicotinic acid N-oxide having the formula:

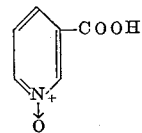

and the therapeutically administrable salts thereof.

8. Process for lowering the cholesterol level in patients, comprising administering to said patients a daily dose of 0.40 to 6 g. of an active compound selected from the group consisting of nicotinic acid N-oxide having the formula:

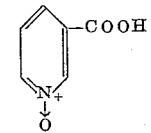

and the therapeutically administrable salts thereof.

References Cited in the file of this patent

Polonovskis: Review of Pure and Applied Chemistry, vol. 3, No. 2, June 1953, p. 86.
Euler: Chem. Abst., vol. 54, 1960, p. 14249(f).
Thompson: Clinical Medicine, vol. 8, No. 3, p. 515, March 1961.